US012760742B2

(12) United States Patent
Zheng et al.

(10) Patent No.: US 12,760,742 B2
(45) Date of Patent: Oct. 13, 2026

(54) HANDHELD FAN

(71) Applicant: SHENZHEN JISU TECHNOLOGY CO., LTD, Shenzhen (CN)

(72) Inventors: Guanzheng Zheng, Shenzhen (CN); Haijun Gao, Shenzhen (CN); Jiahang Xie, Shenzhen (CN); Xin Xiao, Shenzhen (CN)

(73) Assignee: SHENZHEN JISU TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 18/773,754

(22) Filed: Jul. 16, 2024

(65) Prior Publication Data

US 2025/0027506 A1 Jan. 23, 2025

Related U.S. Application Data

(63) Continuation-in-part of application No. PCT/CN2023/139669, filed on Nov. 19, 2023.

(30) Foreign Application Priority Data

Dec. 19, 2022 (CN) ......................... 202223413732.2
Dec. 23, 2022 (CN) ......................... 202223488670.1
(Continued)

(51) Int. Cl.
*F04D 25/08* (2006.01)
*F04D 19/00* (2006.01)
(Continued)

(52) U.S. Cl.
CPC ....... *F04D 25/084* (2013.01); *F04D 25/0673* (2013.01); *F04D 25/0693* (2013.01);
(Continued)

(58) Field of Classification Search
CPC ............... F04D 25/084; F04D 25/0673; F04D 25/0693; F04D 29/056; F04D 19/002;
(Continued)

(56) References Cited

U.S. PATENT DOCUMENTS 2,582,572 A * 1/1952 Tulk ...................... F04D 25/084
416/63
5,962,159 A * 10/1999 Satou .................... H01M 50/50
429/151
(Continued)

FOREIGN PATENT DOCUMENTS

CN 107069877 A * 8/2017 .............. H02J 7/731
KR 101869854 * 6/2018 ......... F04D 25/0673
KR 20200119594 * 10/2020 ......... B01D 39/1607

OTHER PUBLICATIONS

KR20200119594 translation (Year: 2024).*
(Continued)

*Primary Examiner* — David N Brandt
(74) *Attorney, Agent, or Firm* — HOWARD M COHN and Associates, LLC

(57) ABSTRACT

A handheld fan includes an air supply portion and a handheld portion. The handheld portion includes a first outer shell and a battery module arranged in the first outer shell. The battery module includes a battery housing, and a first storage battery and a second storage battery which are arranged in the battery housing. The first storage battery and the second storage battery are connected in series through an electrical connector. The first storage battery and the second storage battery are arranged in a battery housing. The first storage battery and the second storage battery are connected in series or in parallel through an electric connector, which increases the battery capacity of the handheld fan, so that
(Continued)

when a user uses the handheld fan, the battery life can be longer, bringing a better user experience.

22 Claims, 18 Drawing Sheets

(30) Foreign Application Priority Data

| | | |
|---|---|---|
| Jan. 4, 2023 | (CN) | 202320027723.5 |
| Jun. 19, 2023 | (CN) | 202321579734.0 |
| Jul. 17, 2023 | (CN) | 202321895935.1 |

(51) Int. Cl.

| | |
|---|---|
| ***F04D 25/06*** | (2006.01) |
| ***F04D 29/056*** | (2006.01) |
| ***F04D 29/18*** | (2006.01) |
| ***F04D 29/26*** | (2006.01) |
| ***F04D 29/32*** | (2006.01) |
| ***F04D 29/40*** | (2006.01) |
| ***F04D 29/52*** | (2006.01) |
| ***F04D 29/58*** | (2006.01) |
| ***F04D 29/70*** | (2006.01) |
| ***H02J 7/70*** | (2026.01) |

(52) U.S. Cl.
CPC .......... *F04D 29/056* (2013.01); *F04D 19/002* (2013.01); *F04D 25/0606* (2013.01); *F04D 25/082* (2013.01); *F04D 29/181* (2013.01); *F04D 29/263* (2013.01); *F04D 29/325* (2013.01); *F04D 29/403* (2013.01); *F04D 29/522* (2013.01); *F04D 29/5806* (2013.01); *F04D 29/701* (2013.01); *H02J 7/70* (2026.01); *H02J 7/731* (2026.01)

(58) Field of Classification Search
CPC .. F04D 25/0606; F04D 25/082; F04D 29/181; F04D 29/263; F04D 29/325; F04D 29/403; F04D 29/522; F04D 29/5806; F04D 29/701; H02J 7/0042; H02J 7/0044
See application file for complete search history.

(56) References Cited

U.S. PATENT DOCUMENTS

| | | | | |
|---|---|---|---|---|
| 2012/0049776 A1* | 3/2012 | Kern | H02P 6/182 318/400.34 |
| 2022/0186732 A1* | 6/2022 | Mcsheery | H02K 7/14 |
| 2022/0196035 A1* | 6/2022 | Numata | F04D 29/424 |
| 2023/0249229 A1* | 8/2023 | Zhang | F04D 25/084 15/324 |

OTHER PUBLICATIONS

KR101869854 translation (Year: 2024).*
CN-107069877-A translation (Year: 2026).*
“JISULIFE Portable Handheld Turbo Fan, 100 Speeds Adjustable Mini Personal Fan, 9000mAh USB Rechargeable Fan Battery Operated, LED Display, Metal Shell with Accessories Gifts for Men Women Travel-Grey”, Retrieved Jul. 15, 2024. Retrieved from Internet, https://www.amazon.com/JISULIFE-Portable-Multiple-Functions-Gifts-Grey/dp/B0C81CKRPM?ref _=ast_sto_dp&th=1.
“JISULIFE Portable Handheld Turbo Fan, Mini USB Rechargeable Fan [13H Max Cooling Time], 3600mAh Small Battery Personal Fan Pocket Fan with 5 Speeds for Women Men Travel Camping Outdoor Grey”, Retrieved Jul. 15, 2024. Retrieved from Internet, https://www.amazon.com/JISULIFE-Portable-Handheld-Rechargeable-Personal/dp/B0CR3LQ7TK?ref_=ast_sto_dp.

* cited by examiner

HANDHELD FAN

CROSS-REFERENCE TO RELATED APPLICATIONS

The application claims priority of Chinese patent application CN202321895935.1, filed on Jul. 17, 2023, which is incorporated herein by reference in its entireties.

TECHNICAL FIELD

The present disclosure relates to the technical field of fans, and in particular, to a handheld fan.

BACKGROUND

As emerging products, handheld fans are loved by consumers due to their ability to generate natural and continuous cool air, portability, and simple and beautiful appearances. Especially in hot places, people will often carry the handheld fans to blow air for cooling at anytime and anywhere.

At present, there are various types of handheld fans on the market that can meet the basic needs of people. However, most of the existing handheld fans have low battery capacities and cannot meet the need of people for ultra-long battery life during use.

SUMMARY

In a first aspect, the present application provides a handheld fan. The handheld fan includes an air supply portion and a handheld portion, wherein the handheld portion includes a first outer shell and a battery module arranged in the first outer shell;

- the battery module includes a battery housing, and a first storage battery and a second storage battery which are arranged in the battery housing; and the first storage battery and the second storage battery are connected in series through an electrical connector.

Further, a circuit board is arranged on the electrical connector; the circuit board is electrically connected to an external circuit through a conductive wire;

- a first conductive member connected to a positive electrode of the first storage battery and a second conductive member connected to a negative electrode of the second storage battery are arranged at one end of the circuit board close to the conductive wire; a third conductive member connected in series to the first storage battery and the second storage battery is arranged at one end of the circuit board away from the conductive wire;
- a first insulation sheet is arranged at one end close to the conductive wire after the first storage battery and the second storage battery are connected in series; and a second insulation sheet is arranged at one end away from the conductive wire after the first storage battery and the second storage battery are connected in series.

Further, a main control chip is welded on the circuit board; the main control chip is configured to detect a current signal and a voltage signal during charging and discharging of a storage battery circuit.

The main control chip is further configured to balance the current signal and the voltage signal during charging and discharging of the storage battery circuit; and the current signal and the voltage signal of the first storage battery and the second storage battery are balanced by adjusting a resistance value of an internal resistor in the main control chip.

Further, an air supply assembly is arranged in the air supply portion; the air supply assembly includes a driving motor and an impeller assembly; the impeller assembly includes a hub and blades arranged around an outer side of the hub; a motor bearing is arranged in the hub; and both the driving motor and the motor bearing sleeve a rotating shaft.

Further, the driving motor is a three-phase brushless motor, and a working voltage of the driving motor is in a range of 6 V to 8.4 V; a working current of the driving motor is in a range of 0.5 A to 6 A; the power of the driving motor is in a range of 5 W to 50 W; a speed of the driving motor is in a range of 20000 to 80000 revolutions per minute; the first storage battery and the second storage battery are connected in series; and model numbers of the first storage battery and the second storage battery are both 21700.

Further, the driving motor includes a stator and a rotor; the stator includes an iron core and a plurality of coils; the plurality of coils are wound around the iron core; a spacing slot is provided between two adjacent coils; the number of the spacing slots is 6; the rotor includes a magnetic body; the number of magnetic poles of the magnetic body is 2; and the number of pole pairs is 1.

Further, the air supply portion includes a second outer shell, and an air inlet hood and an air nozzle which are clamped with the second outer shell; the air inlet hood is arranged on one side of an air inlet; and the air nozzle is arranged on one side of an air outlet.

Further, a second inner shell, and an air inlet bracket, and an air outlet air guide member which are clamped with the second inner shell are arranged in the second outer shell; one end of the air inlet bracket is clamped with the second inner shell, and the other end of the air inlet bracket is clamped with the air inlet hood; one end of the air outlet air guide member is clamped with the second inner shell; and the other end of the air outlet air guide member is clamped with the air nozzle.

Further, the air inlet hood includes a filter screen and a fixing ring clamped to a periphery of the filter screen; and the filter screen is a regular hexagon.

Further, a base is mounted at a tail end of the handheld portion; the base includes a bottom plate, a side wall structure connected to an edge of the bottom plate, and a base mounting shaft clamped with the side wall structure and the bottom plate; and the side wall structure is provided with a first groove clamped with a base mounting shaft, and a second groove clamped with a bottom plate protrusion.

In a second aspect, the present application further provides a handheld fan, includes an air supply portion and a handheld portion, wherein the handheld portion includes a first outer shell and a battery module arranged in the first outer shell;

- the battery module includes a battery housing, and a first storage battery and a second storage battery which are arranged in the battery housing; and the first storage battery and the second storage battery are connected in parallel through an electrical connector.

Further, an air supply assembly is arranged in the air supply portion; the air supply assembly includes a driving motor and an impeller assembly; the impeller assembly includes a hub and blades arranged around an outer side of the hub; a motor bearing is arranged in the hub; and both the driving motor and the motor bearing sleeve a rotating shaft.

Further, the driving motor is a three-phase brushless motor, and a working voltage of the driving motor is in a range of 3V to 4.2V; a working current of the driving motor is in a range of 0.25 A to 1.8 A; the power of the driving motor is in a range of 1 W to 8 W; a speed of the driving motor is in a range of 15000 to 41000 revolutions per minute; the first storage battery and the second storage battery are connected in parallel; and model numbers of the first storage battery and the second storage battery are both 18650.

Further, the driving motor includes a stator and a rotor; the stator includes an iron core and a plurality of coils; the plurality of coils are wound around the iron core; a spacing slot is provided between two adjacent coils; the number of the spacing slots is 9; the rotor includes a magnetic body; the number of magnetic poles of the magnetic body is 8; and the number of pole pairs is 4.

In a third aspect, the present application further provides a handheld fan, includes an air supply portion and a handheld portion, wherein the handheld portion includes a first outer shell and a battery module arranged in the first outer shell.

The battery module includes a battery housing, and a first storage battery and a second storage battery which are arranged in the battery housing; and the first storage battery and the second storage battery are connected in series;

an air supply assembly is arranged in the air supply portion; the air supply assembly includes a driving motor and an impeller assembly; the driving motor is a three-phase motor; and a working voltage of the driving motor is in a range of 3 V to 8.4 V.

In one embodiment, a working voltage of the driving motor is 3.5 V.

In one embodiment, a working voltage of the driving motor is 3.7 V.

In one embodiment, a working voltage of the driving motor is 4 V.

In one embodiment, a working voltage of the driving motor is 4.2 V.

In one embodiment, a working voltage of the driving motor is 4.3 V.

Compared with the prior art, the present disclosure provides a handheld fan. The first storage battery and the second storage battery are arranged in a battery housing. The first storage battery and the second storage battery are connected in series or in parallel through an electric connector, which increases the battery capacity of the handheld fan, so that when a user uses the handheld fan, the battery life can be longer, bringing a better user experience.

DETAILED DESCRIPTION OF THE EMBODIMENTS

In order to make the aims, technical solution and advantages of the present disclosure will be clearly, the present disclosure is further described below in combination with accompanying drawings and implementations. It should be understood that the specific embodiments described herein are intended only to explain the present disclosure and are not intended to define the present disclosure.

To make the description of the disclosed content more detailed and complete, the following provides explanatory descriptions of the implementations and specific embodiments of the present disclosure. However, this is not the only form of implementing or applying the specific embodiments of the present disclosure. The implementations cover the features of a plurality of specific embodiments, as well as method steps configured to construct and operate these specific embodiments, and a sequence of the metal steps. However, other specific embodiments can also be used to achieve the same or equal functions and sequence of steps. All other embodiments obtained by a person of ordinary skill in the art based on the embodiments of the present disclosure without making creative efforts shall fall within the protection scope of the present disclosure.

It should be noted that the terms "first", "second", etc. in the specification and claims of the present disclosure and the above accompanying drawings are defined to distinguish similar objects, and do not have to be used to describe a specific order or sequence. It should be understood that such used data is interchangeable where appropriate, so that the embodiments of the present disclosure described here can be implemented in an order other than those illustrated or described here.

It should be understood that the term "and/or" herein is only an association relationship that describes associated objects, and represents that there can be three relationships. For example, A and/or B can represent that: A exists alone, A and B exist simultaneously, and B exists alone. In addition, the character "/" herein generally indicates that the front and back associated objects are in an "or" relationship.

Unless otherwise stated, "plurality" means two or more.

Embodiment I

Figure 1:
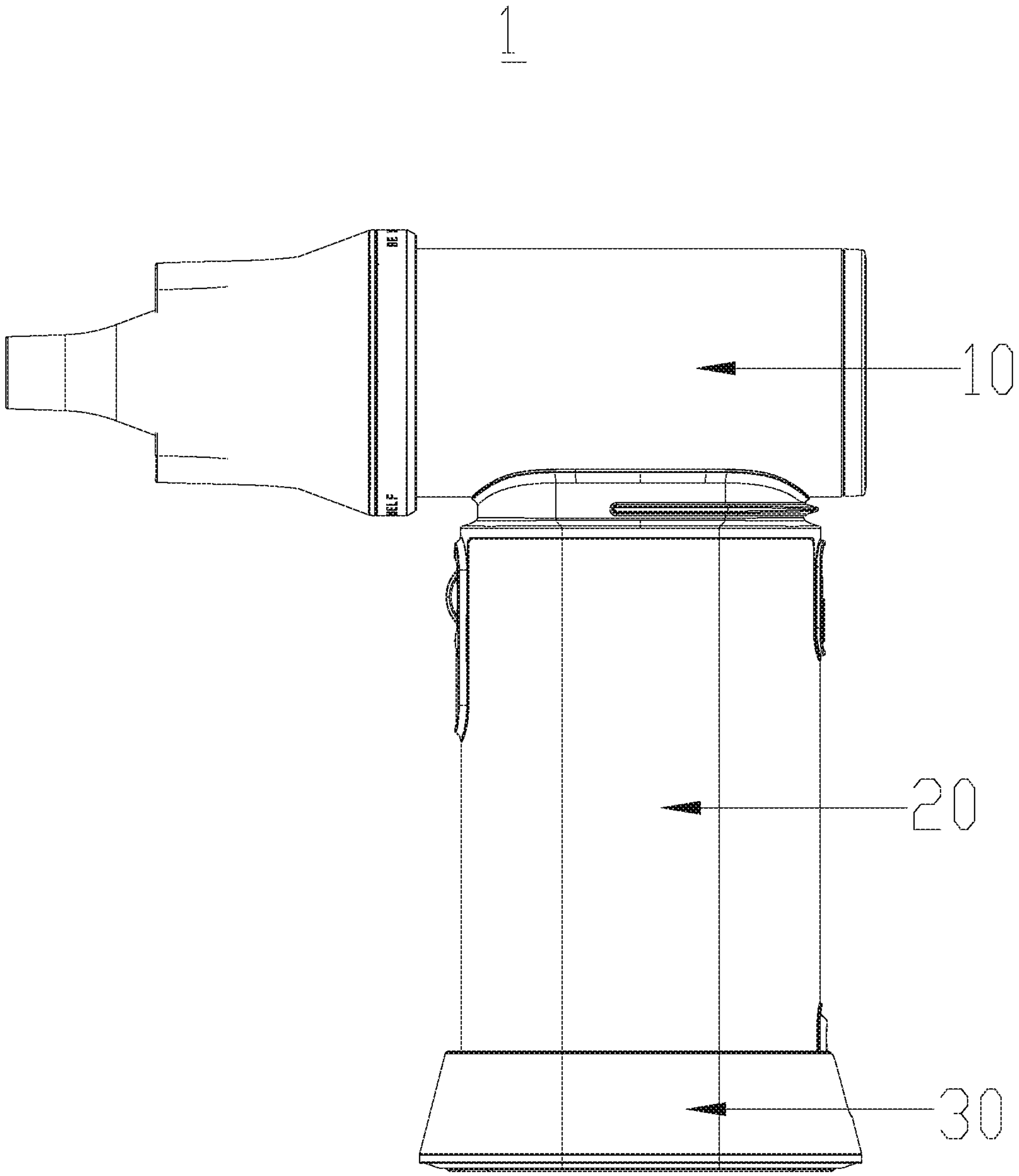
FIG. 1 is a schematic structural diagram of a handheld fan according to an embodiment of the present disclosure.
Figure 2:
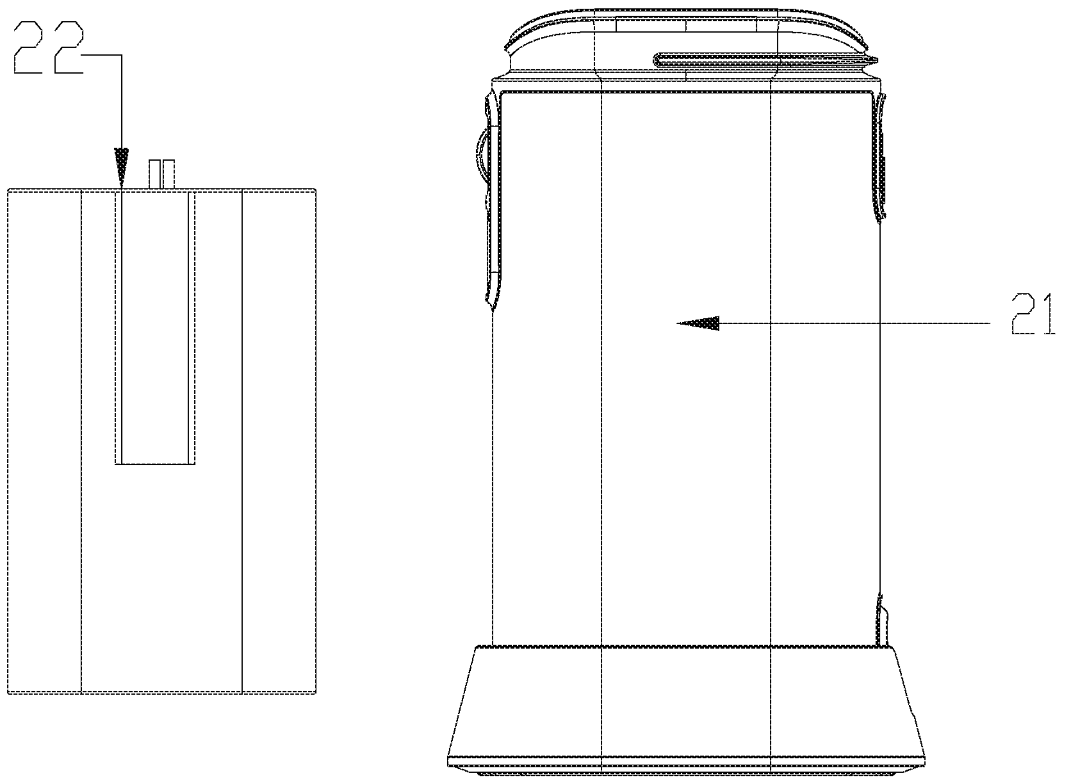
FIG. 2 is an exploded diagram of a handheld portion according to Embodiment I of the present disclosure.
Figure 3:
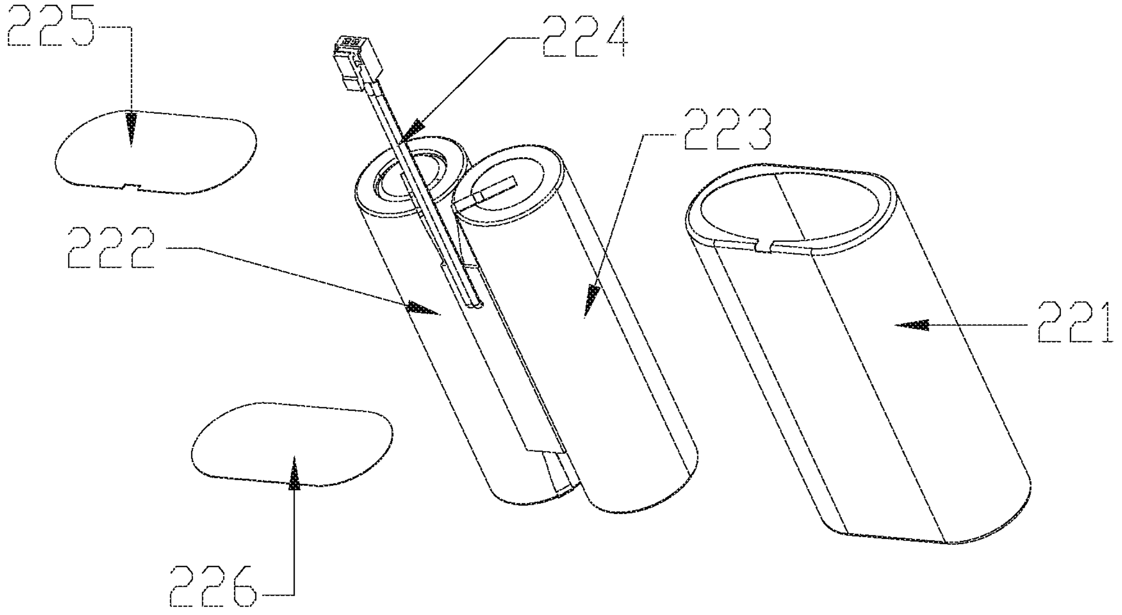
FIG. 3 is an exploded diagram of a battery module according to Embodiment I of the present disclosure.

Referring to FIG. 1 and FIG. 2, Embodiment I of the present disclosure provides a handheld fan 1, including an air supply portion 10 and a handheld portion 20. The handheld portion 20 includes a first outer shell 21 and a battery module 22 arranged in the first outer shell 21. Specifically referring to FIG. 3, the battery module 22 includes a battery housing 221, and a first storage battery 222 and a second storage battery 223 which are arranged in the battery housing 221. The first storage battery 222 and the second storage battery 223 are connected in series through an electrical connector 224.

Specifically, in this embodiment of the present disclosure, the first storage battery 222 and the second storage battery 223 in the battery housing 221 are connected in series through the electrical connector 224. Compared with use of a single storage battery to supply power to the handheld fan 1, use of the two storage batteries increases the battery capacity twice. This can make the battery life longer when a user uses the handheld fan 1, bringing a better user experience.

Figure 4:
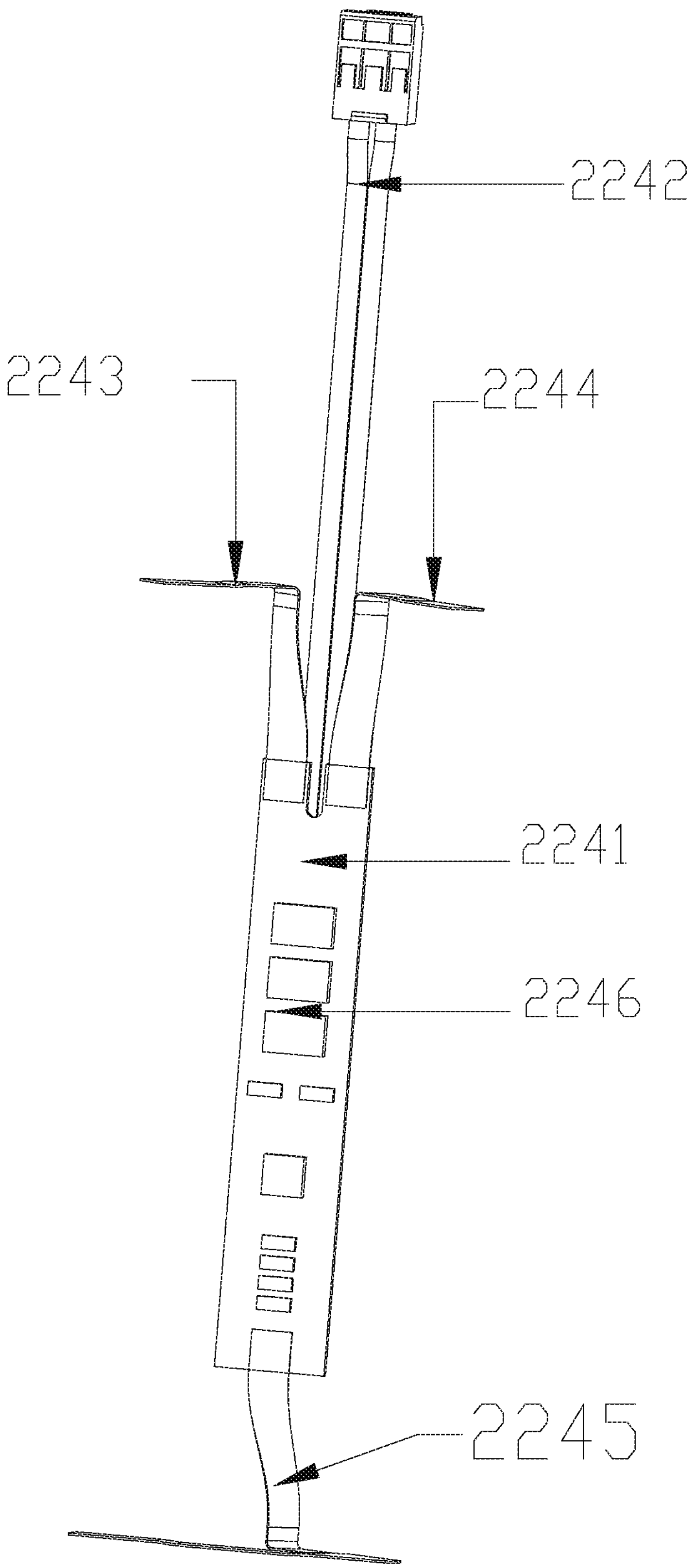
FIG. 4 is a schematic structural diagram of an electrical connector according to Embodiment I of the present disclosure.

Further, referring to FIG. 4, a schematic structural diagram of an electrical connector according to Embodiment I of the present disclosure. The electrical connector 224 is provided with a circuit board 2241. The circuit board 2241 is electrically connected to an external circuit through a conductive wire 2242. The circuit board 2241 is electrically connected to an external circuit through a conductive wire 2242. The external circuit charges the handheld fan 1, thereby meeting the need that the battery module 22 in the handheld fan 1 can be reused.

A first conductive member 2243 connected to a positive electrode of the first storage battery 222 and a second conductive member 2244 connected to a negative electrode of the second storage battery 223 are arranged at one end of the circuit board 2241 close to the conductor wire 2242; and a third conductive member 2245 connected in series to the first storage battery 222 and the second storage battery 223 is arranged at one end of the circuit board 2241 away from the conductor wire 2242. Specifically, the circuit board 2241 has a length and is divided into a first end portion and a second end portion in a lengthwise direction. The first end portion and the second end portion are two opposite end portions of the circuit board 2241. The first end portion is electrically connected to the conductive wire 2242, and the second end portion is electrically connected to the third conductive member 2245. The first conductive member 2243 and the second conductive member 2244 are electrically connected to the first end portion of the circuit board 2241. In this embodiment of the present disclosure, the two storage batteries connected in series receive electric energy from an external circuit and convert the electric energy into chemical energy of the batteries. After the energy of the storage batteries is discharged and consumed, the energy recovers through charging and can be discharged again, thus forming a charging and discharging cycle. The use of the two storage batteries connected in series to receive the electrical energy from the external circuit provides diploid battery capacity, so that the battery life of the handheld fan is longer, and the handheld fan is more suitable for being carried outside.

Further, after the first storage battery 222 and the second storage battery 223 are connected in series, a first insulation sheet 225 is arranged at one end close to the conductive wire 2242; and after the first storage battery 222 and the second storage battery 223 are connected in series, a second insulation sheet 226 is arranged at one end away from the conductive wire 2242. Specifically, when both the first storage battery 222 and the second storage battery 223 are in vertical states, the circuit board 2241 is in a vertical state too. A direction from the second end portion of the circuit board 2241 to the first end portion is upward, which is also above the first storage battery 222 and the second storage battery 223, and a direction from the first end portion of the circuit board 2241 to the second end portion is downward, which is also below the first storage battery 222 and the second storage battery 223. The first insulation sheet 225 is arranged above the first storage battery 222 and the second storage battery 223, and the second insulation sheet 226 is arranged below the first storage battery 222 and the second storage battery 223. In this embodiment of the present disclosure, the insulation sheets are arranged at two ends of the serially connected storage batteries, which can ensure insulation between the positive electrode and negative electrode of the storage batteries and prevent a short circuit between the positive electrode and negative electrode of the storage batteries.

Further, the circuit board 2241 is welded with a main control chip 2246; and the main control chip 2246 is configured to detect a current signal and a voltage signal during charging and discharging of a storage battery circuit, so as to perform overvoltage and overcurrent protection on the circuit during storage battery charging and discharging. In this embodiment of the present disclosure, the main control chip detects, in real time, a current signal and a voltage signal which are input by an external power supply to the storage battery circuit, so as to prevent an external circuit from inputting an excessive voltage signal. If a voltage on an output terminal of the external power supply exceeds a preset voltage of the handheld fan 1, the main control chip can control the conductive wire on the circuit board to be disconnected to cut off the charging and discharging between the handheld fan 1 and the external power supply.

Further, the main control chip 2246 is further configured to balance the current signal and the voltage signal during charging and discharging of the storage battery circuit; and the current signal and the voltage signal of the first storage battery 222 and the second storage battery 223 are balanced by adjusting a resistance value of an internal resistor in the main control chip 2246. In this embodiment of the present disclosure, the main control chip is further configured to balance the current signal and the voltage signal during the charging and discharging of the storage battery circuit. When the battery module includes two or more storage batteries, the current signals output by the storage batteries may differ during use of the handheld fan, which may cause a decrease in the overall working efficiency of the handheld fan and shortening of the lifespan of the handheld fan. However, if each storage battery can be equally loaded, the lifespan of the battery module will be prolonged.

Figure 5:
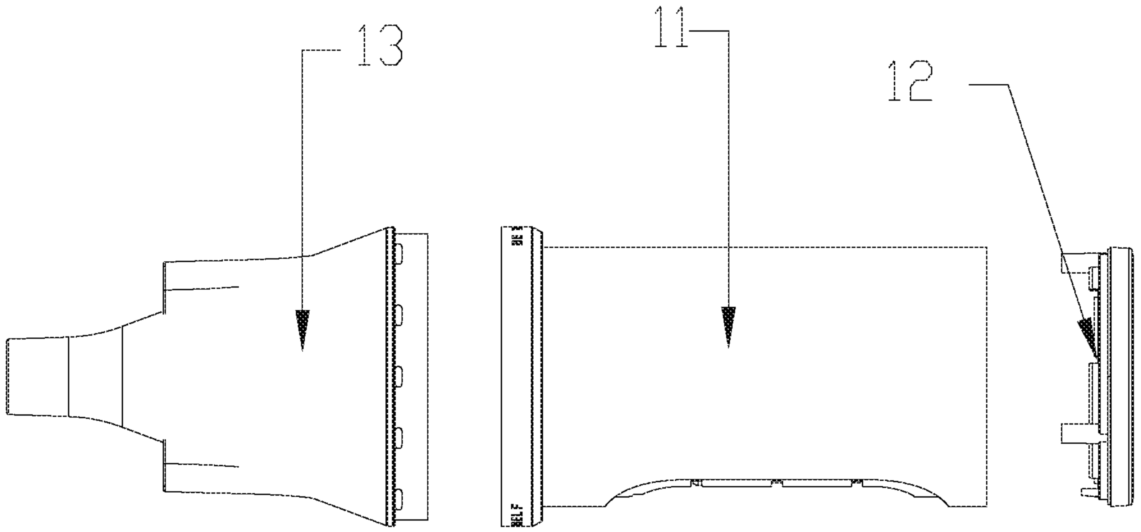
FIG. 5 is a schematic structural diagram of an air supply portion according to Embodiment I of the present disclosure.

Referring to FIG. 5, a schematic structural diagram of an air supply portion according to Embodiment I of the present disclosure is shown. The air supply portion 10 includes a second outer shell 11, and an air inlet hood 12 and an air nozzle 13 which are clamped with the second outer shell 11; the air inlet hood 12 is arranged on one side of an air inlet; and the air nozzle 13 is arranged on one side of an air outlet.

In this embodiment of the present disclosure, the air nozzle 13, the second outer shell 11, and the air inlet hood 12 in the air supply portion 10 are detachably connected. Specifically, the detachable connection is achieved by cooperation between a clamping protrusion and a clamping slot, or cooperation between a buckle and a buckle. Or, other detachable connection ways such as screwing are also acceptable, so that the removal is simple, and it is convenient to timely clean the components such as the air nozzle 13, the second outer shell 11, and the air inlet hood 12.

Figure 6:
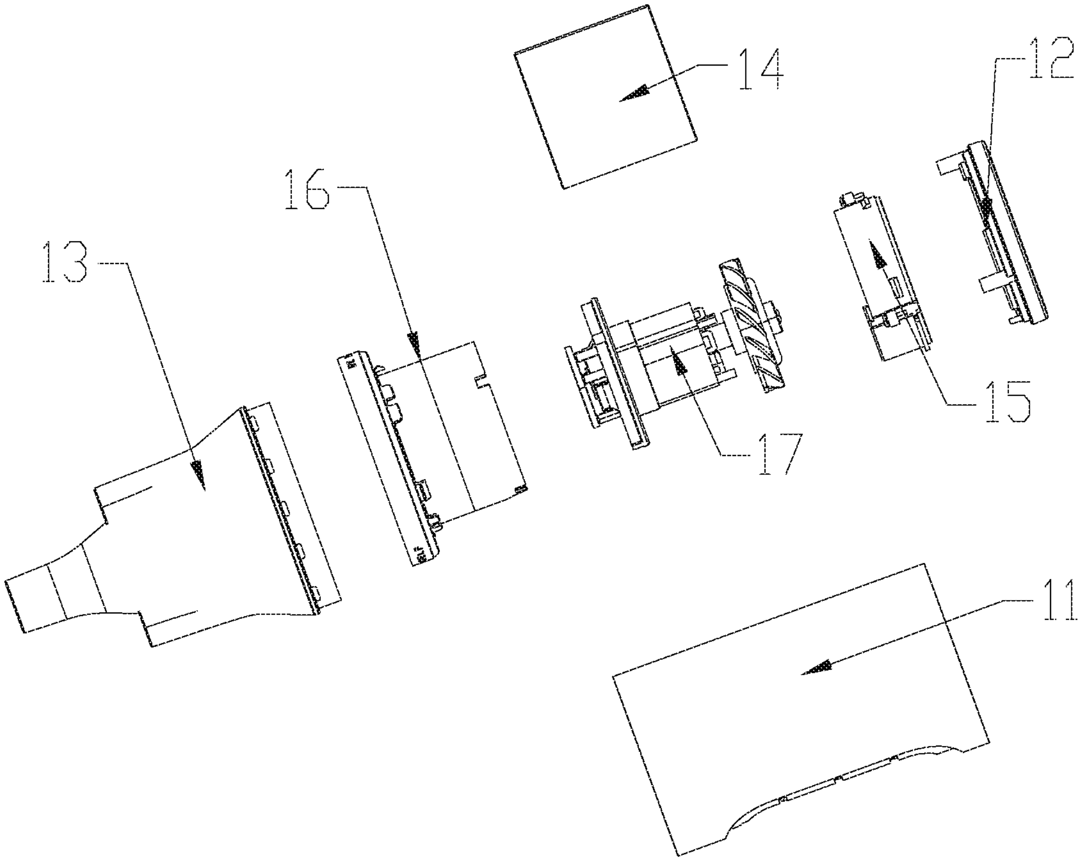
FIG. 6 is an exploded diagram of an air supply portion according to Embodiment I of the present disclosure.

Further, referring to FIG. 6, an exploded diagram of an air supply portion according to Embodiment I of the present disclosure is shown. A second inner shell 14, and an air inlet bracket 15, and an air outlet air guide member 16 which are clamped with the second inner shell 14 are arranged in the second outer shell 11; one end of the air inlet bracket 15 is clamped with the second inner shell 14, and the other end of the air inlet bracket 15 is clamped with the air inlet hood 12; one end of the air outlet air guide member 16 is clamped with the second inner shell 14; and the other end of the air outlet air guide member 16 is clamped with the air nozzle 13. In this embodiment of the present disclosure, the air nozzle 13 is arranged at the air outlet of the handheld fan 1, which can clean dust on objects such as a keyboard around, and further property guide the air in an air duct of an air supply assembly 17, so that the air supplied by the handheld fan 1 is more uniform, thus achieving high air outlet efficiency and smoother air supplying.

Figure 7:
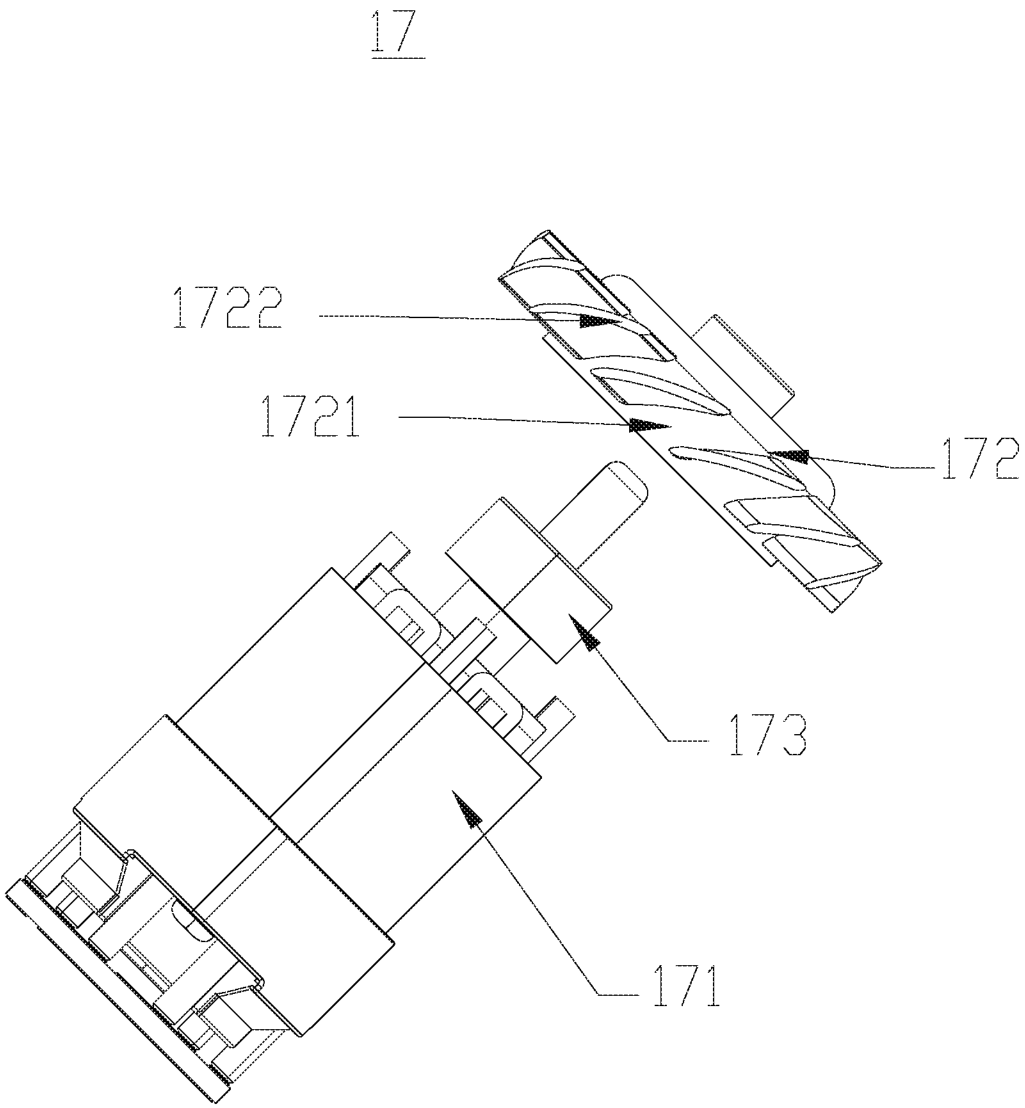
FIG. 7 is a schematic structural diagram of an air supply assembly according to Embodiment I of the present disclosure.
Figure 8:
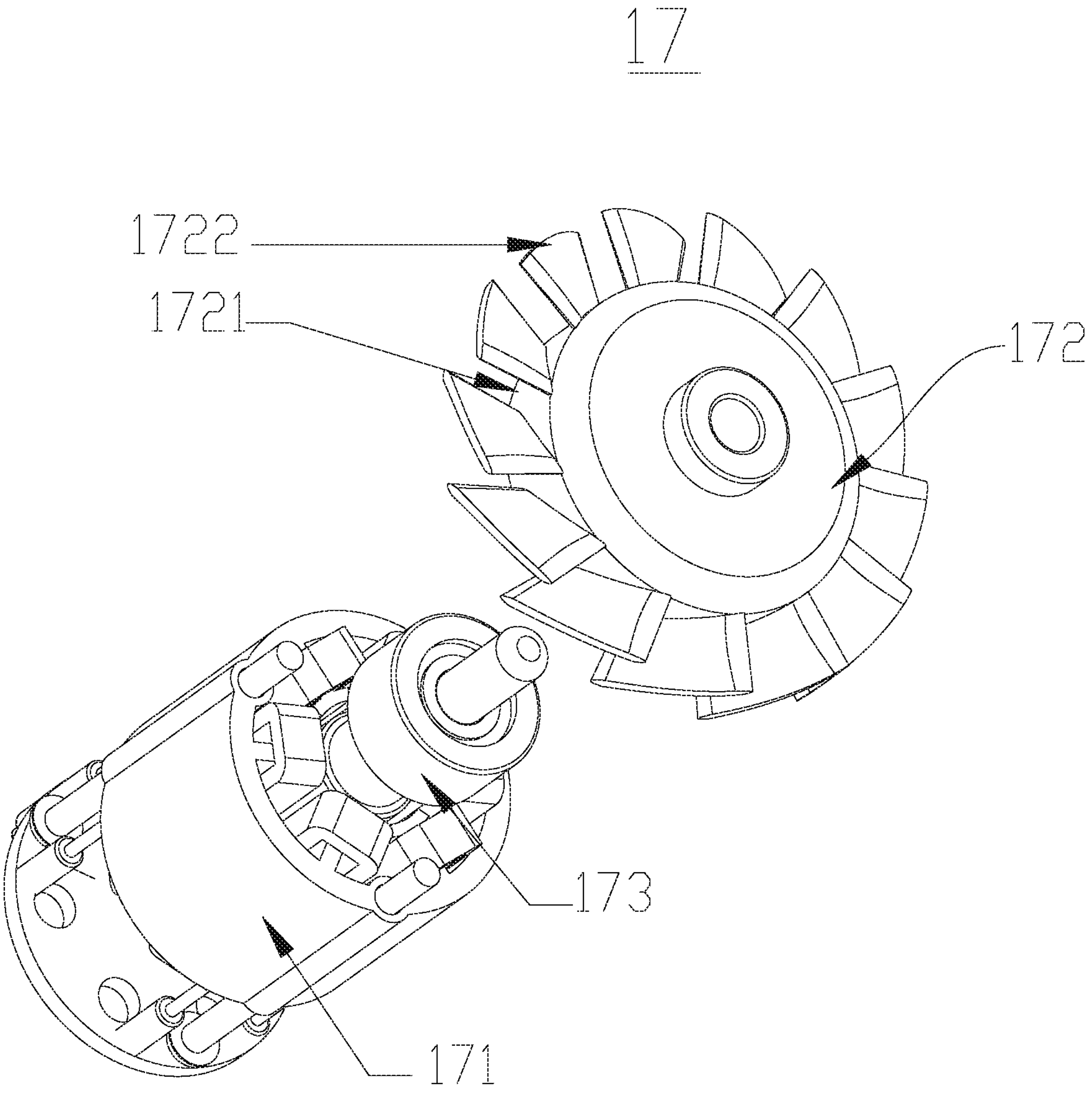
FIG. 8 is a schematic structural diagram of another angle of the air supply assembly shown in FIG. 7.

Referring to FIG. 7 and FIG. 8, schematic structural diagrams of an air supply assembly in different angles according to Embodiment I of the present disclosure are shown. An air supply assembly 17 is arranged in the air supply portion 14; the air supply assembly 17 includes a driving motor 171 and an impeller assembly 172; the impeller assembly 172 includes a hub 1721 and blades 1722 arranged around an outer side of the hub 1721; a motor bearing 173 is arranged in the hub 1721; and both the driving motor 171 and the motor bearing 173 sleeve a rotating shaft. Specifically, in this embodiment, the number of the blades 1722 is 12. The 12 blades 1722 are uniformly distributed on an outer peripheral side of the hub 1721. In other embodiments, the number of the blades 1722 can be other numbers, such as 13, 15, or 10. The specific number can be set as needed and is not limited in the present disclosure.

In this embodiment of the present disclosure, when a user uses the handheld fan 1, the blades 1722 rotate under the driving of the driving motor 171 to guide the air from the air inlet hood 12 to an air duct space of the air supply assembly 17. The user can hold the handheld fan and blow the air towards parts that need to be cooled, thereby achieving the objectives of rapid cooling and improving the comfort.

Figure 9:
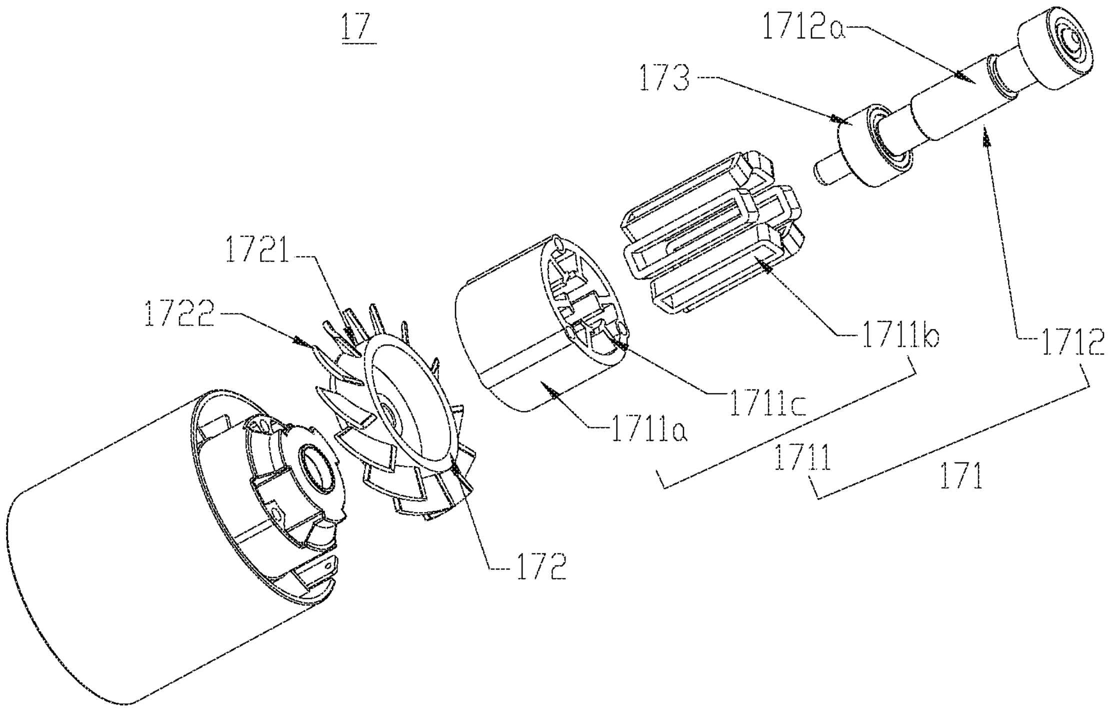
FIG. 9 is an exploded diagram of the air supply assembly shown in FIG. 7.
Figure 10:
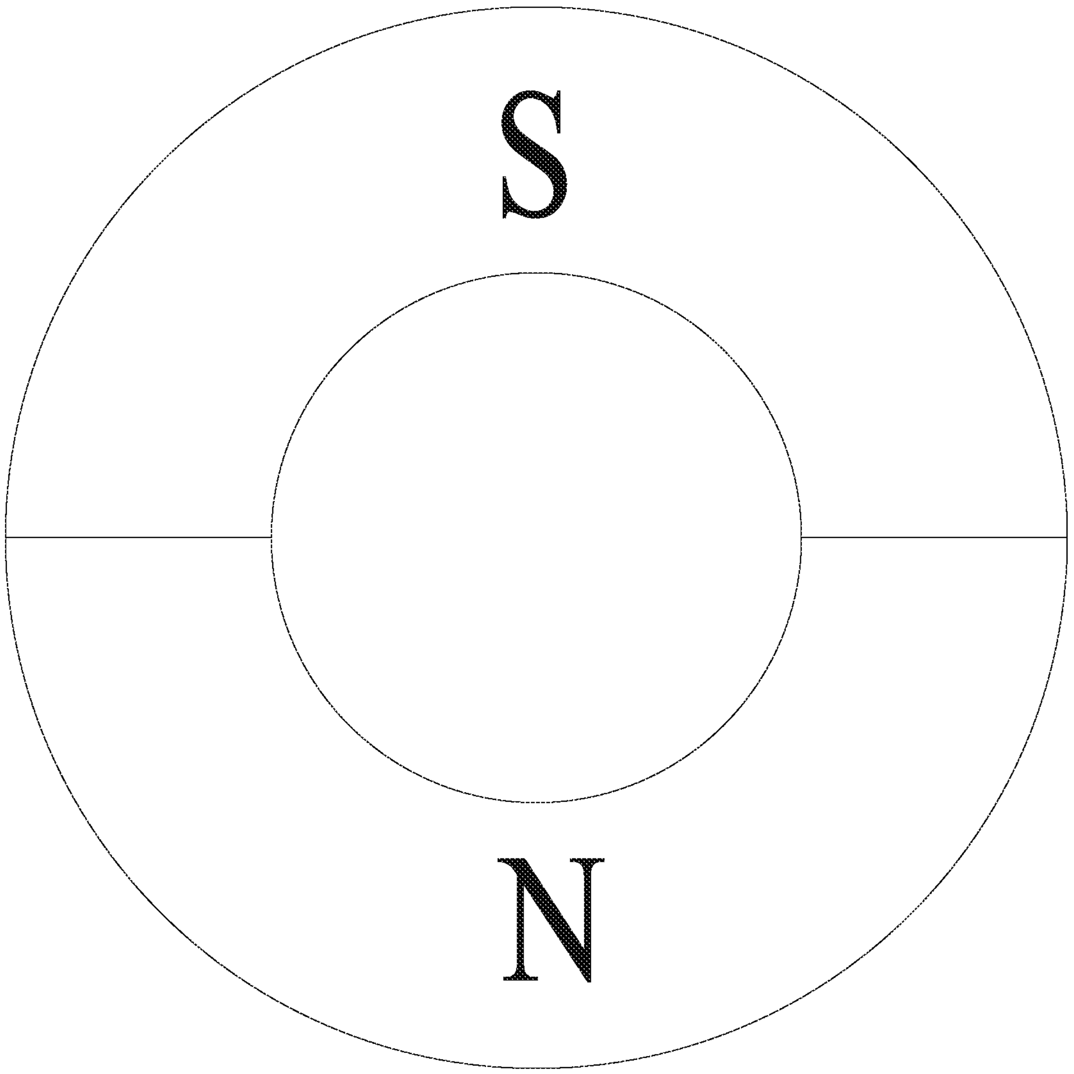
FIG. 10 is a schematic diagram of the number of magnetic poles of a magnetic body of the air supply assembly shown in FIG. 7.

Referring to FIG. 9, an exploded diagram of the air supply assembly shown in FIG. 7 is shown. The driving motor 171 includes a stator 1711 and a rotor 1712; the stator 1711 includes an iron core 1711*a* and a plurality of coils 1711*b*; the plurality of coils 1711*b* are wound around the iron core 1711*a*; a spacing slot 1711*c* is provided between two adjacent coils 1711*b*; the number of the spacing slots 1711*c* is 6; and the rotor 1712 includes a magnetic body 1712*a*. Referring to FIG. 10, a schematic diagram of the number of magnetic poles of the magnetic body of the air supply assembly shown in FIG. 7 is shown. In this embodiment, the number of magnetic poles of the magnetic body 1712*a* is 2; and the number of pole pairs is 1.

In this embodiment, the driving motor 171 is a three-phase brushless motor, and a working voltage of the driving motor 171 is in a range of 6 V to 8.4 V; a working current of the driving motor 171 is in a range of 0.5 A to 6 A; the power of the driving motor 171 is in a range of 5 W to 50 W; and a speed of the driving motor 171 is in a range of 20000 to 80000 revolutions per minute.

Specifically, the value of the working voltage of the driving motor 171 can be any integer or decimal between 6 V and 8.4 V. Common standard voltage values may include 6.0 V, 6.3 V, 7.2 V, 8.0 V, 8.4 V, and the like. The value of the working current of the driving motor 171 can be any integer or decimal between 0.5 A and 6 A. For example, possible current values include 0.5 A, 1.0 A, 2.0 A, 3.0 A, 4.0 A, 5.0 A, 6.0 A, and the like. These values represent the current that can be made continuously to the driving motor under normal running conditions. The value of the power of the driving motor 171 can be any integer or decimal between 5 W and 50 W. For example, possible values of the power include 5.0 W, 10.0 W, 15.0 W, 20.0 W, 25.0 W, 30.0 W, 35.0 W, 40.0 W, 45.0 W, 50.0 W, and the like. These values represent the power that can be output by the driving motor under normal running conditions. Selecting appropriate values for the working voltage, the working current, and the power is crucial for ensuring the performance and efficiency of the motor. In practical applications, the appropriate working power should be determined according to the specifications of the motor and expected load requirements.

In this embodiment, the first storage battery 222 and the second storage battery 223 are connected in series, and the model numbers of the first storage battery 222 and the second storage battery 223 are both 21700.

In another embodiment, the driving motor 171 may alternatively be a three-phase motor, and the working voltage of the driving motor 171 is in a range of 3 V to 8.4 V. Specifically, the working voltage of the driving motor 171 can be 3 V, 3.5 V, 3.7 V, 4 V, 4.2 V, 4.3 V, or other values such as 5 V, 6.0 V, 6.3 V, 7.2 V, 8.0 V, and 8.4 V, as long as these values are within the aforementioned range. It should be understood that these voltage values are rated values, i.e. standard values, but may fluctuate during use due to the problem of constant voltage or constant current.

Figure 11:
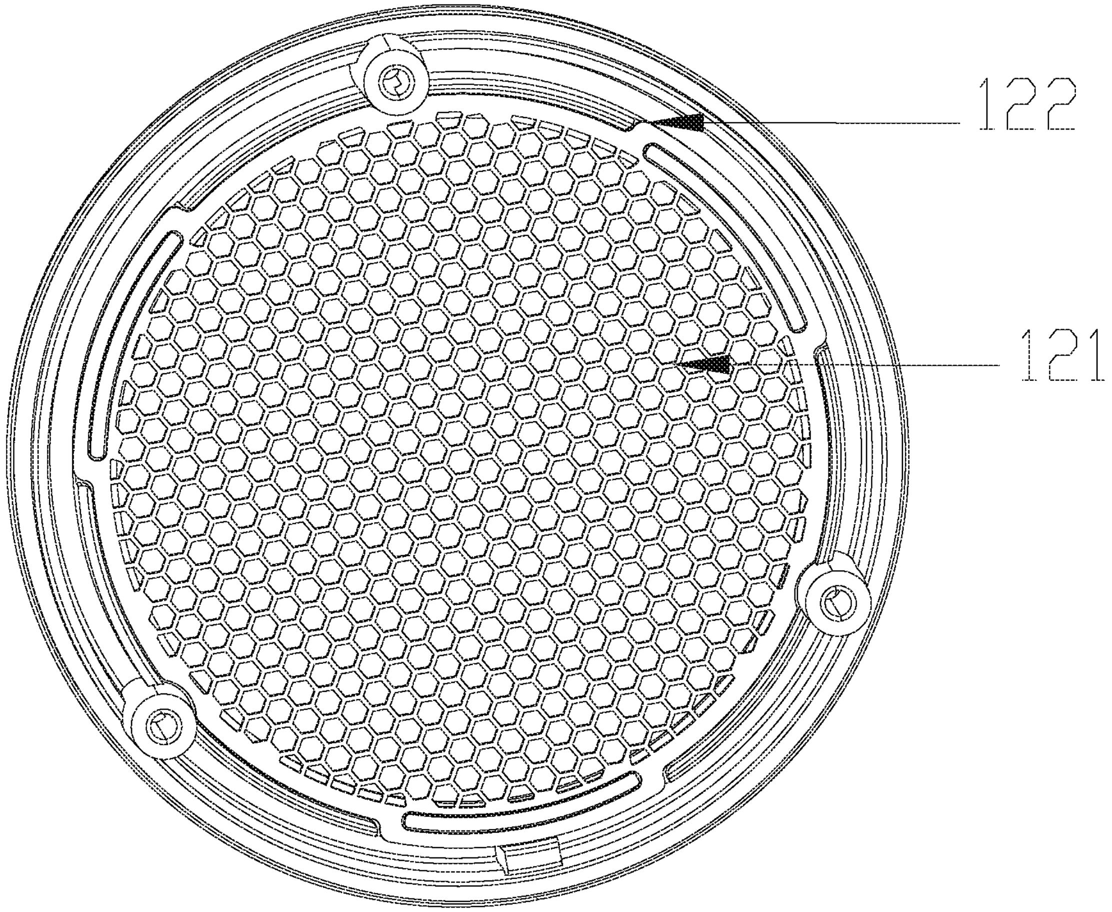
FIG. 11 is a schematic structural diagram of an air inlet hood according to an embodiment of the present disclosure.

Referring to FIG. 11, a schematic structural diagram of an air inlet hood according to Embodiment I of the present disclosure is shown. The air inlet hood 12 includes a filter screen 121 and a fixing ring 122 clamped to a periphery of the filter screen 121; and the filter screen 121 is a regular hexagon. In this embodiment of the present disclosure, the filter screen 121 is arranged in the air intake hood 12. The filter screen 121 is a metal filter screen, and the metal filter screen is a regular hexagon. The rectangularly hexagonal metal filter screen can ensure that the air intake area of the air intake hood can be maximized under the same filter screen area.

Figure 12:
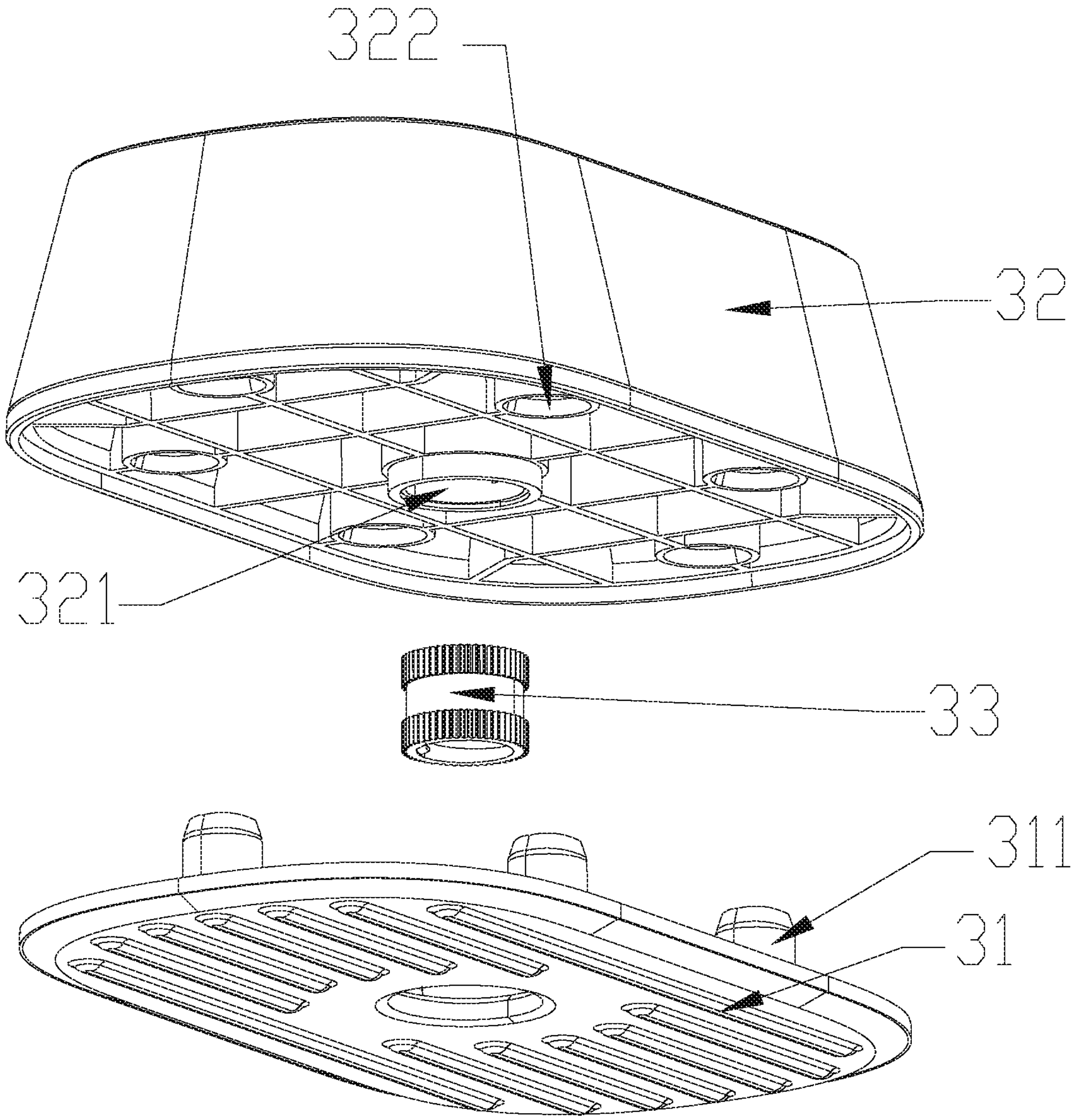
FIG. 12 is a schematic structural diagram of a base according to an embodiment of the present disclosure.

Further, referring to FIG. 12, a schematic structural diagram of a base according to Embodiment I of the present disclosure is shown. A base 30 is mounted at a tail end of the handheld portion 20; the base 30 includes a bottom plate 31, a side wall structure 32 connected to an edge of the bottom plate 31, and a base mounting shaft 33 clamped with the side wall structure 32 and the bottom plate 31; and the side wall structure 32 is provided with a first groove 321 clamped with a base mounting shaft 33, and a second groove 322 clamped with a bottom plate protrusion 311. In this embodiment of the present disclosure, the base 30 is mounted at the tail end of the handheld portion of the handheld fan 1. In an indoor situation, the handheld fan 1 can alternatively be placed on a desktop, so that it is more convenient to use the handheld fan 1.

The handheld fan 1 provided by the present disclosure includes an air supply portion 10 and a handheld portion 20. The handheld portion 20 includes a first outer shell 21 and a battery module 22 arranged in the first outer shell 21. The battery module 22 includes a battery housing 221, and a first storage battery 222 and a second storage battery 223 arranged in the battery housing 221. The first storage battery 222 and the second storage battery 223 are connected in series through an electrical connector 224. According to the handheld fan 1 provided in the present disclosure, the two storage batteries arranged in the battery module 22 are connected in series, which increases the battery capacity of the handheld fan 1, so that when a user uses the handheld fan 1, the battery life can be longer, bringing a better user experience.

Embodiment II

For ease of description and convenience of understanding, the present disclosure emphatically describes a structural difference between the handheld fan 1' in Embodiment II and the handheld fan 1 in Embodiment I, and the structures of other identical portions will not be elaborated.

Figure 13:
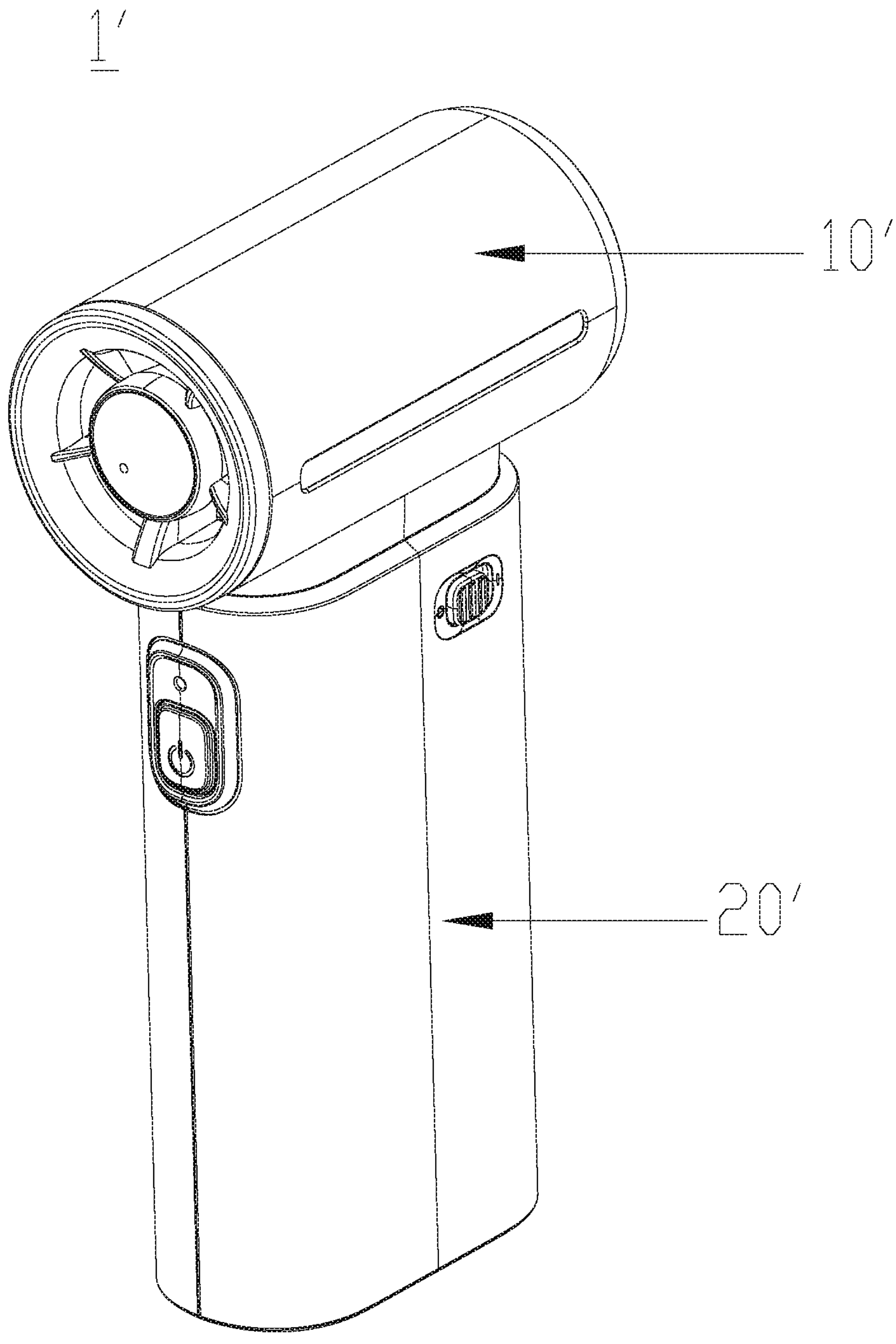
FIG. 13 is a schematic structural diagram of a handheld fan according to Embodiment II of the present disclosure.
Figure 14:
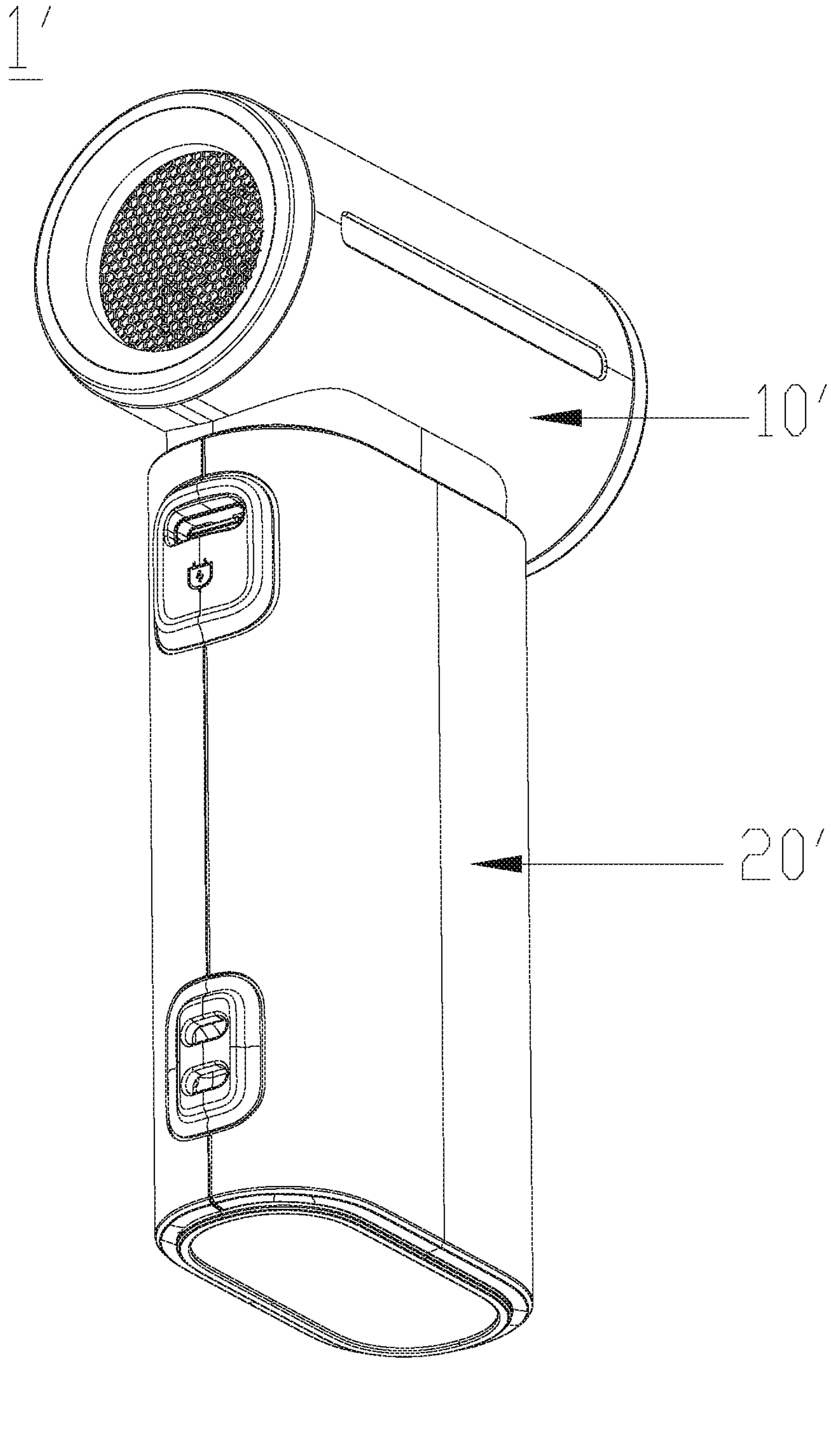
FIG. 14 is a schematic structural diagram of another angle of a handheld fan according to Embodiment II of the present disclosure.

Referring to FIG. 13 and FIG. 14, the handheld fan 1' provided in Embodiment I of the present disclosure includes an air supply portion 10' and a handheld portion 20'. The handheld portion 20' includes a first outer shell 21' and a battery module 22' arranged in the first outer shell 21'. The battery module 22' includes a battery housing 221', and a first storage battery 222' and a second storage battery 223' which are arranged in the battery housing 221'. The first storage battery 222' and the second storage battery 223' are connected in parallel through an electrical connector 224'.

Figure 15:
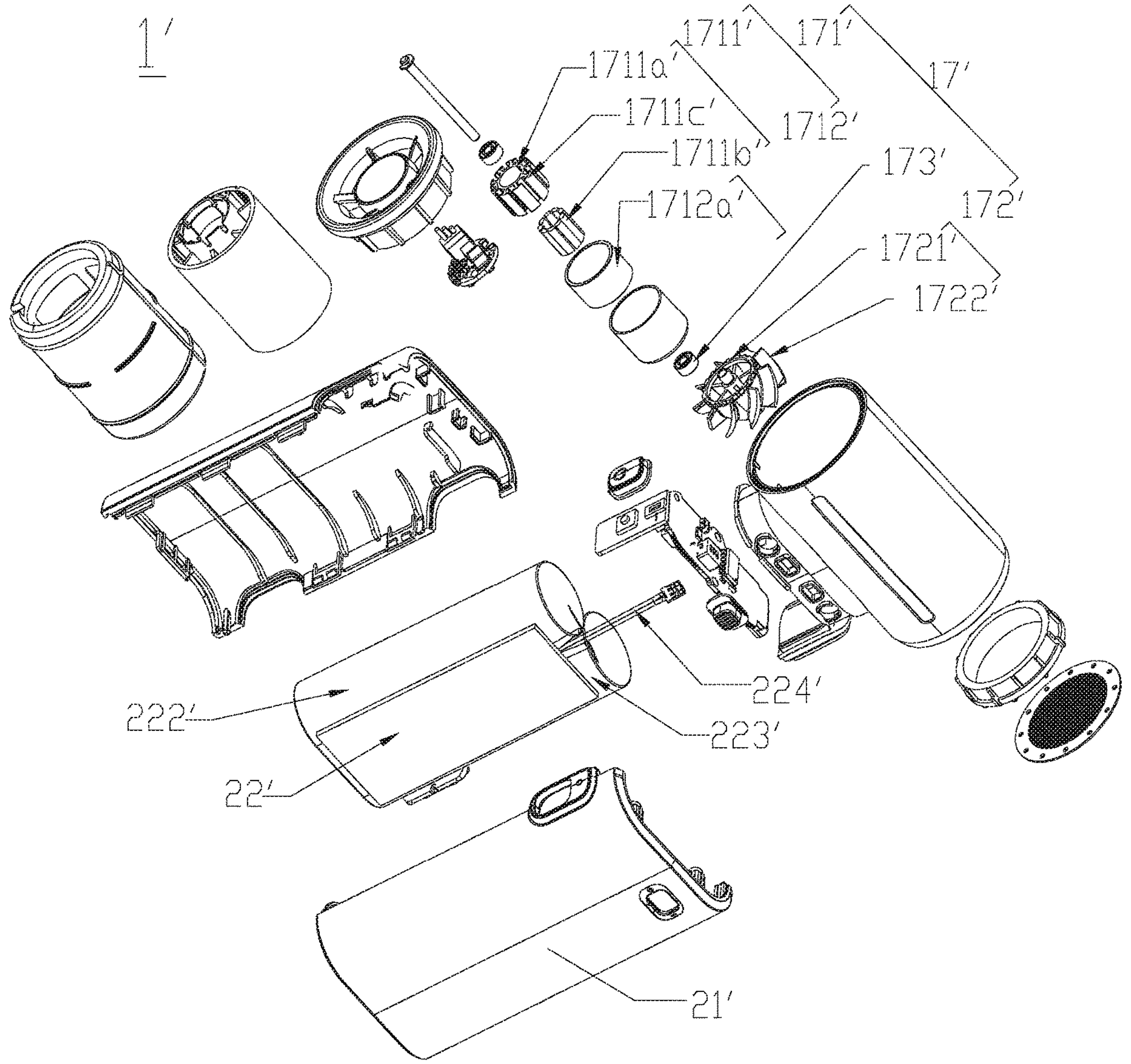
FIG. 15 is an exploded diagram of a handheld fan according to Embodiment II of the present disclosure.
Figure 16:
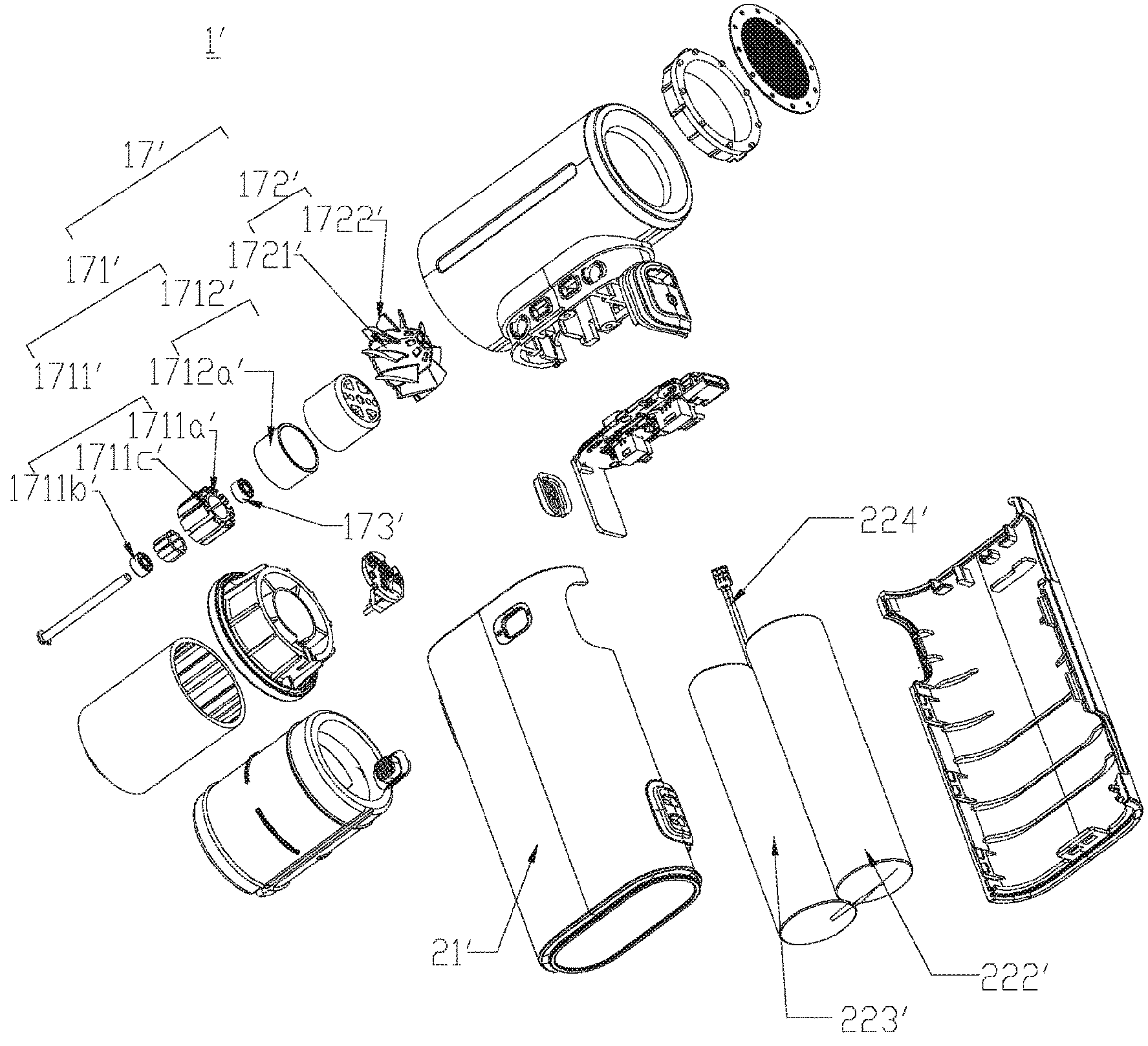
FIG. 16 is an exploded diagram of another angle of a handheld fan according to Embodiment II of the present disclosure.
Figure 17:
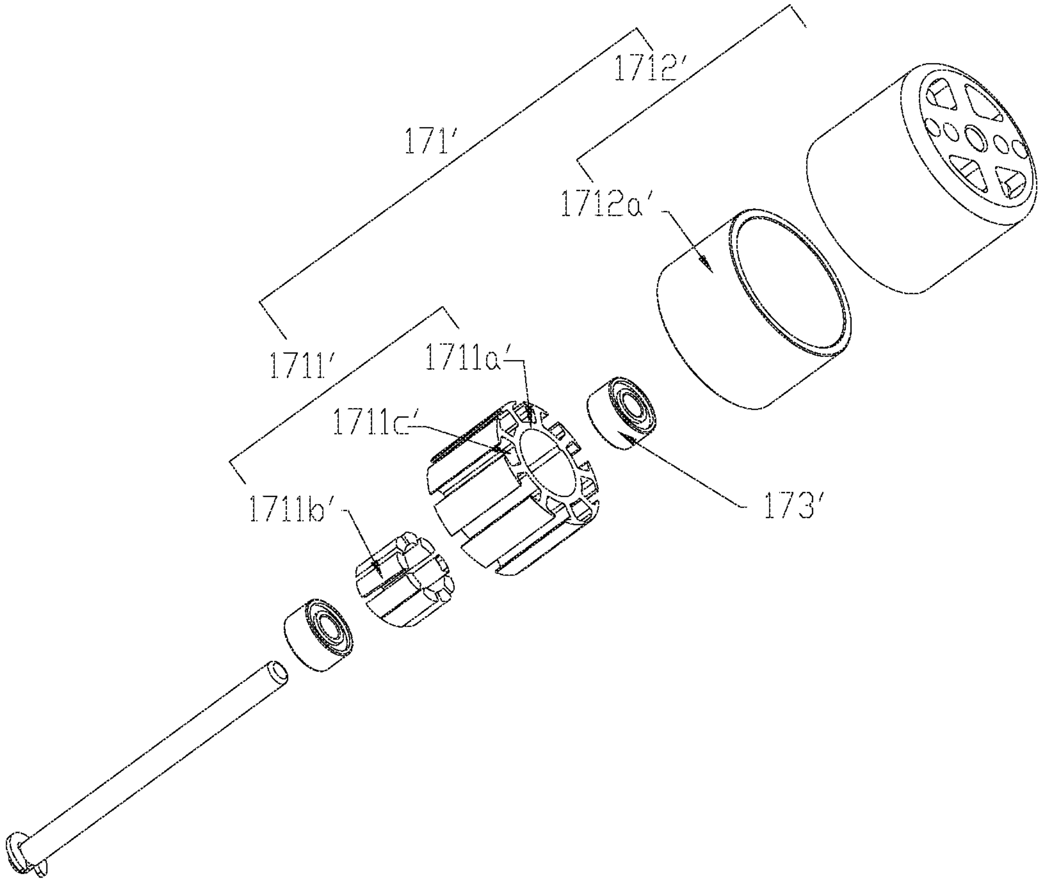
FIG. 17 is a schematic structural diagram of a driving motor of a handheld fan according to Embodiment II of the present disclosure.

Referring to FIG. 15, FIG. 16, and FIG. 17, exploded diagrams of a handheld fan 1' in different angles according to Embodiment II of the present disclosure are shown. In Embodiment II, an air supply assembly 17' is arranged in the air supply portion 10'; the air supply assembly 17' includes a driving motor 171' and an impeller assembly 172'; the impeller assembly 172' includes a hub 1721' and blades 1722' arranged around the hub 1721'; a motor bearing 173' is arranged in the hub 1721'; and the driving motor 171' and a motor bearing 173' sleeve a rotating shaft.

Figure 18:
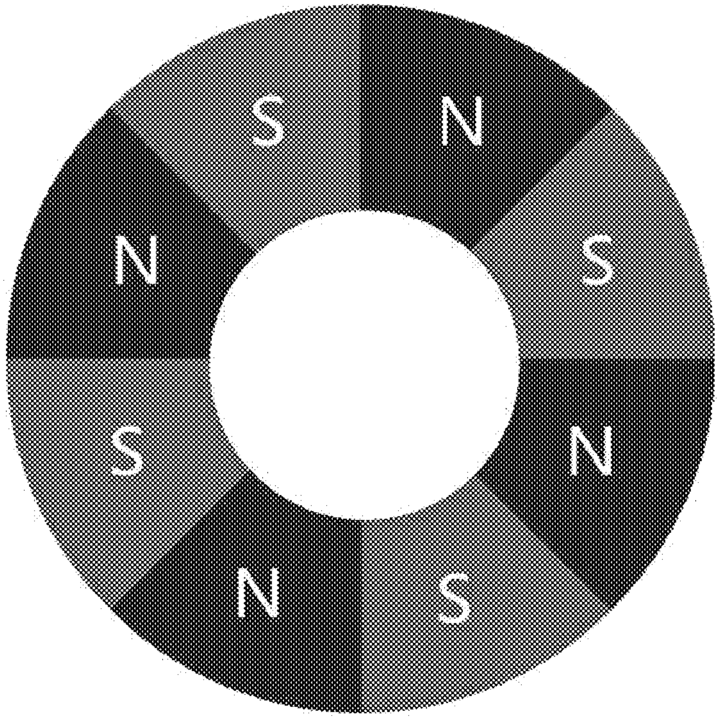
FIG. 18 is a schematic diagram of the number of magnetic poles of a magnetic body of an air supply assembly of a handheld fan according to Embodiment II of the present disclosure.

Specifically, in Embodiment II, the number of the blades 1722' is 9. The 9 blades 1722' are uniformly distributed on an outer peripheral side of the hub 1721'. In other embodiments, the number of the blades 1722' can be other numbers, such as 12, 13, 15, or 10. The specific number can be set as needed and is not limited in the present disclosure. In embodiment II, the driving motor 171' includes a stator 1711' and a rotor 1712'; the stator 1711' includes an iron core **1711*a*' and a plurality of coils 1711*b*'; the plurality of coils 1711*b*' are wound around the iron core 1711*a*'; a spacing slot 1711*c*' is provided between two adjacent coils 1711*b*'; and the number of the spacing slots 1711*c*' is 9. The rotor 1712' includes a magnetic body 1712*a*'. Referring to FIG. 18, a schematic diagram of the number of magnetic poles of the magnetic body 1712*a*' of the air supply assembly 17' shown in Embodiment II is shown. In Embodiment II, the number of magnetic poles of the magnetic body 1712*a*'** is 8; and the number of pole pairs is 4.

Specifically, in Embodiment II, the driving motor 171' is a three-phase brushless motor, and a working voltage of the driving motor 171' is in a range of 3 V to 4.2 V; a working current of the driving motor 171' is in a range of 0.25 A to 1.8 A; the power of the driving motor 171' is in a range of 1 W to 8 W; a speed of the driving motor 171' is in a range of 15000 to 41000 revolutions per minute; the first storage battery 222' and the second storage battery 223' are connected in parallel; and model numbers of the first storage battery 222' and the second storage battery 223' are both 18650. As mentioned above, the specific values of the working voltage, working current, and power of the driving motor 171' can be integers or decimals within the foregoing ranges, so that the driving motor can output them as needed under a normal running condition. Selecting appropriate values for the working voltage, the working current, and the power is crucial for ensuring the performance and efficiency of the motor. In practical applications, the appropriate working power should be determined according to the specifications of the motor and expected load requirements.

In another embodiment, the driving motor 171' may alternatively be a three-phase motor, and the working voltage of the driving motor 171' is in a range of 3 V to 8.4 V. Specifically, the working voltage of the driving motor 171' can be 3 V, 3.5 V, 3.7 V, 4 V, 4.2 V, 4.3 V, or other values such as 5 V, 6.0 V, 6.3 V, 7.2 V, 8.0 V, and 8.4 V, as long as these values are within the aforementioned range. It should be understood that these voltage values are rated values, i.e. standard values, but may fluctuate during use due to the problem of constant voltage or constant current.

In addition, various different implementation modes of the present disclosure can also be arbitrarily combined, and these combinations should also be regarded as the content disclosed in the present disclosure, as long as they do not violate the idea of the present disclosure.

The above descriptions are only preferred embodiments of the present disclosure, and are not intended to limit the patent scope of the present disclosure. Any equivalent structural transformation made by using the content of the specification and the drawings of the present disclosure under the invention idea of the present disclosure, directly or indirectly applied to other related technical fields, shall all be included in the scope of patent protection of the present disclosure.

What is claimed is:

1. A handheld fan for cooling, comprising an air supply portion (10) and a handheld portion (20), wherein the handheld portion (20) comprises a first outer shell (21) and a battery module (22) arranged in the first outer shell;

the battery module (22) comprises a battery housing (221), and a first storage battery (222) and a second storage battery (223) arranged in the battery housing (221); and the first storage battery (222) and the second storage battery (223) are connected through an electrical connector (224), wherein the air supply portion (10) comprises an air supply assembly (17), and the air supply assembly (17) comprises a driving motor (171), wherein the circuit board has an upper end and a lower end opposite to the upper end; a conductive wire (2242) connected to the upper end of the circuit board is configured to be electrically connected to an external circuit; and the electrical connector (224) further comprises: a first conductive member (2243) connected to a positive electrode of the first storage battery, a second conductive member (2244) connected to a negative electrode of the second storage battery, and a third conductive member (2245) electrically connected to the lower end of the circuit board; wherein the first conductive member (2243) and the second conductive member (2244) are electrically connected to the upper end of the circuit board to form a Y shape.

2. The handheld fan according to claim 1, wherein a first insulation sheet (225) and a second insulation sheet (226), the first insulation sheet (225) being arranged at one end of the first storage battery (222) and the second storage battery (223) adjacent to the conductive wire (2242) after the first storage battery (222) and the second storage battery (223) are connected in series; and the second insulation sheet (226) being arranged at another end of the first storage battery (222) and the second storage battery (223) away from the conductive wire (2242) after the first storage battery (222) and the second storage battery (223) are connected in series.

3. The handheld fan according to claim 1, wherein the air supply assembly (17) further comprises an impeller assembly (172); the impeller assembly (172) comprises a hub (1721) and blades (1722) arranged around an outer side of the hub (1721); a motor bearing (173) is arranged in the hub (1721); and both the driving motor (171) and the motor bearing (173) sleeve a rotating shaft.

4. The handheld fan according to claim 3, wherein the first storage battery (222) and the second storage battery (223) are connected in series to provide the working voltage in the range of 6 V to 8.4 V.

5. The handheld fan according to claim 3, wherein the driving motor (171) comprises a stator and a rotor; the stator comprises an iron core and a plurality of coils; the plurality of coils are wound around the iron core; a spacing slot is provided between two adjacent coils of the plurality of coils; a number of the spacing slots is 6; the rotor comprises a magnetic body; a number of magnetic poles of the magnetic body is 2; and a number of pole pairs is 1.

6. The handheld fan according to claim 1, wherein the air supply portion (10) comprises a second outer shell (11), and an air inlet hood (12) and an air nozzle (13) which are clamped with the second outer shell (11); the air inlet hood (12) is arranged on one side of an air inlet; and the air nozzle (13) is arranged on one side of an air outlet.

7. The handheld fan according to claim 6, wherein a second inner shell (14), and an air inlet bracket (15), and an air outlet air guide member (16) which are clamped with the second inner shell (14) are arranged in the second outer shell (11); one end of the air inlet bracket (15) is clamped with the second inner shell (14), and another end of the air inlet bracket (15) is clamped with the air inlet hood (12); one end of the air outlet air guide member (16) is clamped with the second inner shell (14); and an other end of the air outlet air guide member (16) is clamped with the air nozzle (13).

8. The handheld fan according to claim 6, wherein the air inlet hood (12) comprises a filter screen (121) and a fixing ring (122) clamped to a periphery of the filter screen (121); and the filter screen (121) comprises a plurality of air inlet holes arranged to be staggered with each other and each air inlet hole is in a shape of a regular hexagon.

9. The handheld fan according to claim 1, wherein a base (30) is mounted at a tail end of the handheld portion (20); the base (30) comprises a bottom plate (31), a side wall structure (32) connected to an edge of the bottom plate (31), and a base mounting shaft (33) clamped with the side wall structure (32) and the bottom plate (31); and the side wall structure (32) is provided with a first groove (321) clamped with the base mounting shaft (33), and a second groove (322) clamped with a bottom plate protrusion (311).

10. The handheld fan according to claim 1, wherein the air supply assembly (17) further comprises an impeller assembly (172); the driving motor (171) is a three-phase motor; and a working voltage of the driving motor (171) is in a range of 3 V to 8.4 V, a power of the driving motor (171) is in a range of 5 W to 50 W, and the working voltage is provided through the first storage battery (222) and the second storage battery (223).

11. The handheld fan according to claim 10, wherein the working voltage of the driving motor (171) is 3.5 V.

12. The handheld fan according to claim 10, wherein the working voltage of the driving motor (171) is 3.7 V.

13. The handheld fan according to claim 10, wherein the working voltage of the driving motor (171) is 4 V.

14. The handheld fan according to claim 10, wherein the working voltage of the driving motor (171) is 4.2 V.

15. The handheld fan according to claim 10, wherein the working voltage of the driving motor (171) is 4.3 V.

16. The handheld fan according to claim 1, wherein the driving motor (171) is a three-phase brushless motor, and a working voltage of the driving motor (171) is in a range of 3 V to 4.2 V; a working current of the driving motor (171) is in a range of 0.25 A to 1.8 A; a power of the driving motor (171) is in a range of 1 W to 8 W; a speed of the driving motor (171) is in a range of 15000 to 41000 revolutions per minute, and the electrical connector (224) comprises a circuit board (2241); and the working voltage of the driving motor is provided through the first storage battery (222) and the second storage battery (223).

17. The handheld fan according to claim 16, wherein the driving motor (171) comprises a stator and a rotor; the stator comprises an iron core and a plurality of coils; the plurality of coils are wound around the iron core; a spacing slot is provided between two adjacent coils of the plurality of coils; a number of the spacing slots is 9; the rotor comprises a magnetic body; a number of magnetic poles of the magnetic body is 8; and a number of pole pairs is 4.

18. The handheld fan according to claim 16, wherein the first storage battery (222) and the second storage battery (223) are connected in parallel to directly provide the working voltage in the range of 3V to 4.2V.

19. The handheld fan according to claim 1, wherein the first storage battery, the second storage battery, and the electrical connector are arranged in the battery housing in a length direction of the battery housing.

20. The handheld fan according to claim 1, wherein the third conductive member (2245) is connected in series to the first storage battery (222) and the second storage battery (223).

21. The handheld fan according to claim 1, wherein the first storage battery (222) and the second storage battery (223) are arranged along a direction perpendicular to an axial direction of the air supply portion (10).

22. The handheld fan according to claim 1, wherein the driving motor (171) is a three-phase brushless motor, and a working voltage of the driving motor (171) is in a range of 6 V to 8.4 V; a working current of the driving motor (171) is in a range of 0.5 A to 6 A; a power of the driving motor (171) is in a range of 5 W to 50 W; a speed of the driving motor (171) is in a range of 20000 to 80000 revolutions per minute, and the electrical connector (224) comprises a circuit board (2241).

* * * * *